United States Patent [19]
Gibbons

[11] Patent Number: 5,973,677
[45] Date of Patent: Oct. 26, 1999

[54] RECHARGEABLE, UNTETHERED ELECTRONIC STYLUS FOR COMPUTER WITH INTERACTIVE DISPLAY SCREEN

[75] Inventor: Michael L. Gibbons, Grapevine, Tex.

[73] Assignee: Telxon Corporation, Woodlands, Tex.

[21] Appl. No.: 08/779,671

[22] Filed: Jan. 7, 1997

[51] Int. Cl.[6] ................................................ G09G 5/00
[52] U.S. Cl. ..................... 345/179; 178/18.04; 320/107; 320/115; 345/180
[58] Field of Search ...................................... 345/179, 173, 345/180; 178/18.01, 18.03, 18.04, 18.05, 19.03; 320/107, 108, 115, DIG. 11

[56] References Cited

U.S. PATENT DOCUMENTS

| | | | |
|---|---|---|---|
| 3,644,873 | 2/1972 | Dalton et al. | 320/115 |
| 5,007,085 | 4/1991 | Greanias et al. | 345/180 |
| 5,308,936 | 5/1994 | Biggs et al. | 178/18.04 |
| 5,355,100 | 10/1994 | Riggio, Jr. | 345/179 |
| 5,384,688 | 1/1995 | Rockwell | 345/179 |
| 5,401,917 | 3/1995 | Yoshida et al. | 345/179 |
| 5,446,633 | 8/1995 | Hanggi | 320/107 |
| 5,459,489 | 10/1995 | Redford | 345/179 |
| 5,468,947 | 11/1995 | Danielson et al. | 235/472 |
| 5,496,992 | 3/1996 | Madan et al. | 235/462 |
| 5,528,002 | 6/1996 | Katabami | 345/179 |

OTHER PUBLICATIONS

Title: *Metanetics Corporation IR–2000 Hand Held Image Reader User's Guide*. To the best of Applicant's knowledge, this publication was published more than one year prior to the filing date of the above–named patent application.

*Primary Examiner*—Jeffery A. Hofsass
*Assistant Examiner*—John Tweel, Jr.
*Attorney, Agent, or Firm*—Watts, Hoffmann, Fisher & Heinke

[57] ABSTRACT

A pen based workslate computer having a detachable, rechargeable stylus is disclosed. The workslate computer includes a housing supporting computer electronics and a stylus charging station defining an opening adapted to receive the detachable stylus. The housing also supports a visible interactive display screen assembly including a sensing assembly. Depending on the position of actuators of the stylus, signal generation circuitry of the stylus generates one of a plurality of signals having different frequencies. The generated signal is received by the sensing assembly and correlated with a position of the stylus with respect to the display screen assembly by the sensing assembly thereby allowing data and/or commands to be input by an operator manipulating a signal generation end of the stylus to "pick" icons or other representations displayed on a LCD screen. When the stylus is inserted in the charging station opening it is held in place by a clamping mechanism and charging circuitry of the charging station recharges a rechargeable power source of the stylus.

19 Claims, 6 Drawing Sheets

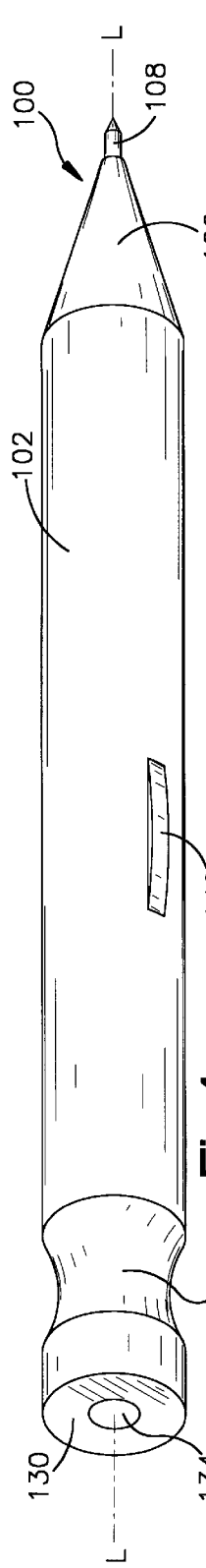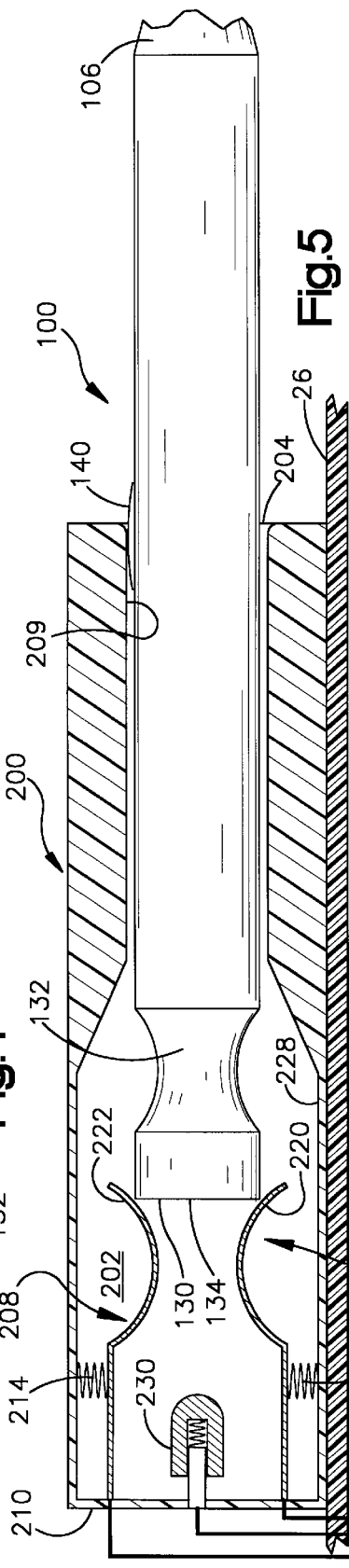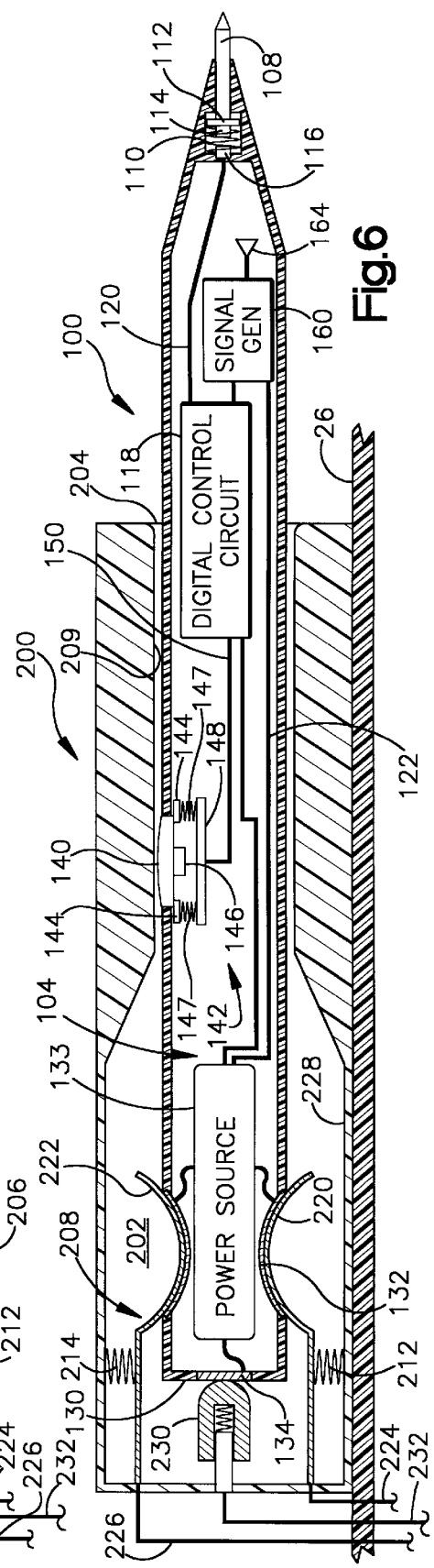

RECHARGEABLE, UNTETHERED ELECTRONIC STYLUS FOR COMPUTER WITH INTERACTIVE DISPLAY SCREEN

FIELD OF THE INVENTION

The present invention relates to a computer having an interactive display screen facilitating user input of data and commands and, more particularly, to a rechargeable, untethered electronic stylus for a computer having an interactive display screen.

BACKGROUND OF THE INVENTION

Hand held, portable computers have gained widespread acceptance in recent years. In various service and manufacturing businesses, hand held computers having interactive display screens are being utilized in production control and inventory control functions as well as product and package expediting. Hand held computers having relatively large interactive display screens are often referred to as workslate computers. The interactive display screen permits an operator of a workslate computer to input data and commands by appropriately touching the screen.

Some interactive display screens are touch sensitive, that is, input to the computer occurs when the screen receives directed pressure from the operator's finger or other appropriate object such as a pen or stylus. The display screen sensing circuitry detects the directed pressure using transducers or other sensing means and determines which portion of the display screen was touched. If a stylus is used in conjunction with a touch screen interactive display screen, the stylus itself does not perform any electronic function. Unfortunately, touch screen interactive display screens are not very durable and, therefore, are not well suited for many manufacturing, warehousing and package delivery environments where a workslate computer is prone to be bumped, dropped, etc.

As an alternative to a workslate computer with a touch screen interactive display screen, pen based workslate computers offer interactive display screen technologies which allow for a more durable construction. In pen based workslate computers, the pen or stylus is active, that is, when operational it generates a signal which when in proximity to the workslate computer interactive display screen is received by the workslate computer circuitry. Depending on the technology of the interactive display screen sensing circuitry, a distal tip of the pen or stylus may emit electromagnetic signals, radio frequency (rf) signals or acoustical signals which are received by sensing circuitry of the interactive display screen.

The sensing circuitry correlates the received signals to a position on the screen which corresponds to the position of the tip of the stylus on the screen. The position and movement of the pen is tracked and interpreted as a data or command input to the workslate computer microprocessor. Icons may be displayed to give the operator command options and the operator may select a command by appropriately touching the display screen surface with the stylus in the region where the icon corresponding to the desired command is located. A handwriting recognition module may be provided to enable the user to input data by "writing" on the display screen surface. A layer of tempered glass overlies the display screen. The tempered glass provides a durable layer of protection over a display surface of the display screen. The tempered glass is resistant to scratching and protects the sensing surface from damage if impacted by another object.

In order to generate appropriate signals, an electronic pen or stylus of a pen based workslate computer must include appropriate electronic circuitry and has to be coupled to a source of power. One way of supplying power to a electronic stylus is to tether the stylus to the computer's internal power source with a coiled power cord. Such a coiled power cord between the computer housing and the electronic stylus, however, tends to interfere with the operator's ability to use the stylus since the cord may wrap around a portion of the computer housing during use, become knotted or may lay on the display screen surface requiring the operator to push it out of the way to properly position the stylus on the display screen tempered glass surface. Adding a power cord retraction assembly increases the weight of the workslate computer and is prone to failure.

To avoid the use of a coiled or retractable power cord to power an electronic stylus, some styluses have been designed to receive one or more batteries internally which provide power to the stylus electronic circuitry. Typically, the batteries are watch batteries and are received in an interior region of the stylus housing which is accessible by removing a portion of the stylus housing from the remainder of the stylus. The batteries provide a finite working life for the stylus. Additionally, operators using such a stylus have a tendency to remove the removable portion of the stylus housing. This often results in the removable portion and/or the batteries being lost or damaged.

What is needed is a untethered or detachable stylus which has an increased useful life between battery changes and is less susceptible to damage due to repeated removal of a portion of the stylus housing.

SUMMARY OF THE INVENTION

The current invention provides an untethered, rechargeable electronic stylus for a computer having an interactive display screen. The electronic stylus may be configured to work in conjunction with any type of interactive display screen, that is, the stylus can be fitted with electronic circuitry that generates an appropriate signal required by the selected interactive display screen sensing assembly. Preferably, the stylus includes a case or housing supporting one or more rechargeable batteries and a connection assembly to permit recharging the one or more rechargeable batteries. The stylus also includes signal generating circuitry for generating one or more signals recognizable by the interactive display screen sensing circuitry of the hand held computer. In a preferred embodiment the signal generating circuitry includes a radio frequency (rf) transmitter which is capable of generating a selected one of three different frequency signals depending upon the input received by a digital control circuit.

The one or more rechargeable batteries preferably are comprised of Nickel-Cadmium (Ni-Cd). Alternatively, rechargeable batteries comprised of Nickel Metal Hydride (Ni-H) may be utilized. Yet another option is rechargeable batteries comprised of a Lithium Ion composition (Li-Ion).

These and other advantages and features of this invention will be clearly understood through consideration of the following detailed description of the invention in conjunction with the accompanying drawings.

BRIEF DESCRIPTION OF THE DRAWINGS

FIG. 4 is a front elevation view of the electronic stylus;

FIG. 5 is a sectional view of the stylus partially inserted into a stylus recharging station of the workslate computer;

FIG. 6 is a sectional view of the stylus completely inserted into the stylus recharging station and schematically shows selected electronic circuitry inside the stylus;

DETAILED DESCRIPTION

Figure 1:
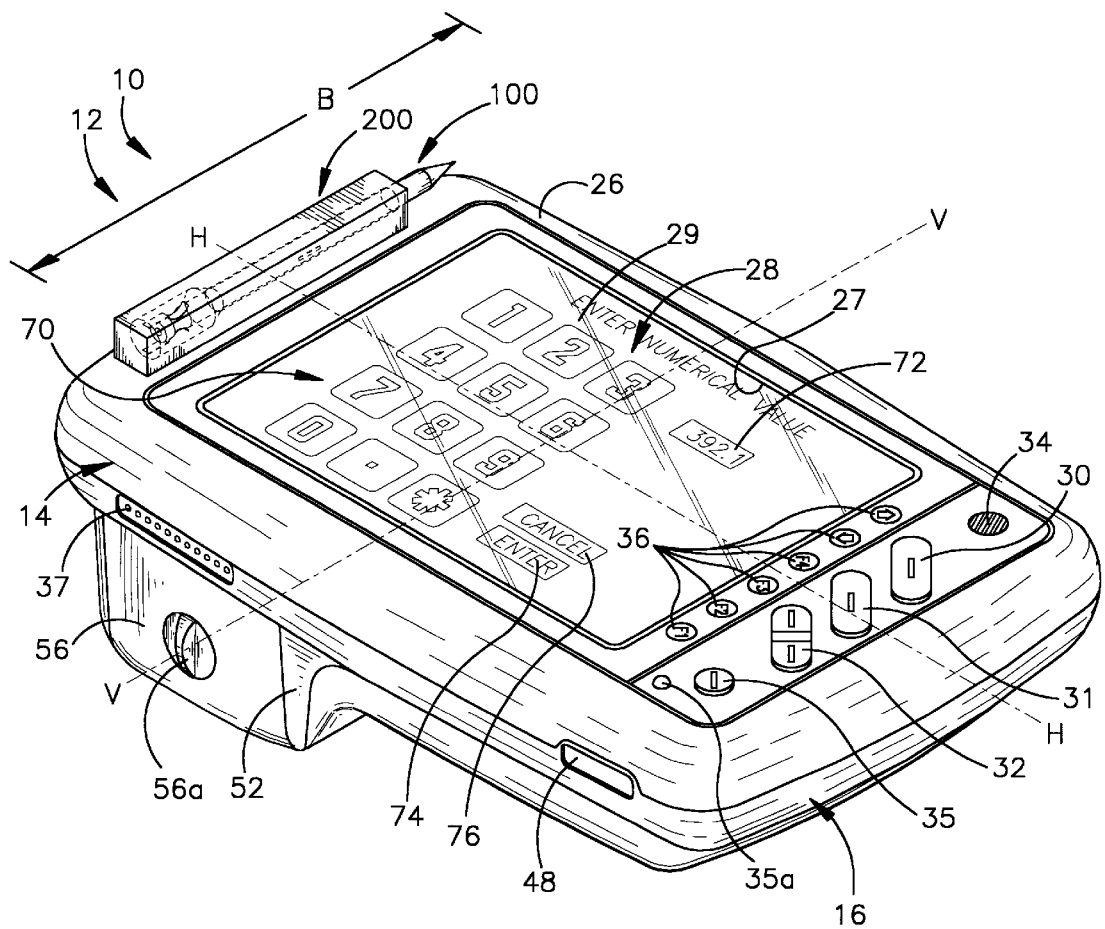
FIG. 1 is a perspective view of a hand held pen based workslate computer including an untethered, rechargeable electronic stylus of the present invention.

Turning to the drawings, a pen based workslate computer is shown generally at 10 in FIG. 1. The workslate computer 10 is shown in its base form, that is without any peripheral modules attached to it. A more complete description of a workslate computer having selectively attachable functional modules is found in U.S. application Ser. No. 08/722,858, filed Sep. 26, 1996 and entitled "Portable Workslate Computer Having Standardized Bus Connection For Interfacing With Peripheral Module". Application Ser. No. 08/722,858 is incorporated herein in its entirety by reference.

The workslate computer 10 includes a two piece housing 12 comprising an upper half or section 14 and a lower half or section 16. The lower section 16 and the upper section 14 of the housing 12 are attached by six screws (not shown) which extend through respective openings in the lower section and screw into aligned openings in the upper section. A docking station cover 18 (FIG. 2) is removably affixed to the lower section 16 by six screws (not shown) which extend through respective openings in bosses of the cover 18 and screw into threaded openings in aligned bosses extending downwardly from a stepped inwardly extending ledge 22 of the lower section 16. As can best be seen in FIG. 3, the inwardly extending portion of the stepped ledge 22 supports a printed circuit (PC) board 23. Both the top side 24 and the bottom side of the PC board 23 support electronic circuitry of the workslate computer 10. For simplicity, only a portion of the electronic circuitry mounted on the PC board top side 24 is shown in the Figures. Typical dimensions of the workslate computer housing 12 are:

| Description | Label | Dimension |
| --- | --- | --- |
| Length | A (FIG. 2) | 7.00 inches |
| Width | B (FIG. 1) | 4.40 inches |
| Thickness | C (FIG. 2) | 1.05 inches |
| Thickness (extending portion) | D (FIG. 2) | 2.00 inches |

Figure 3:
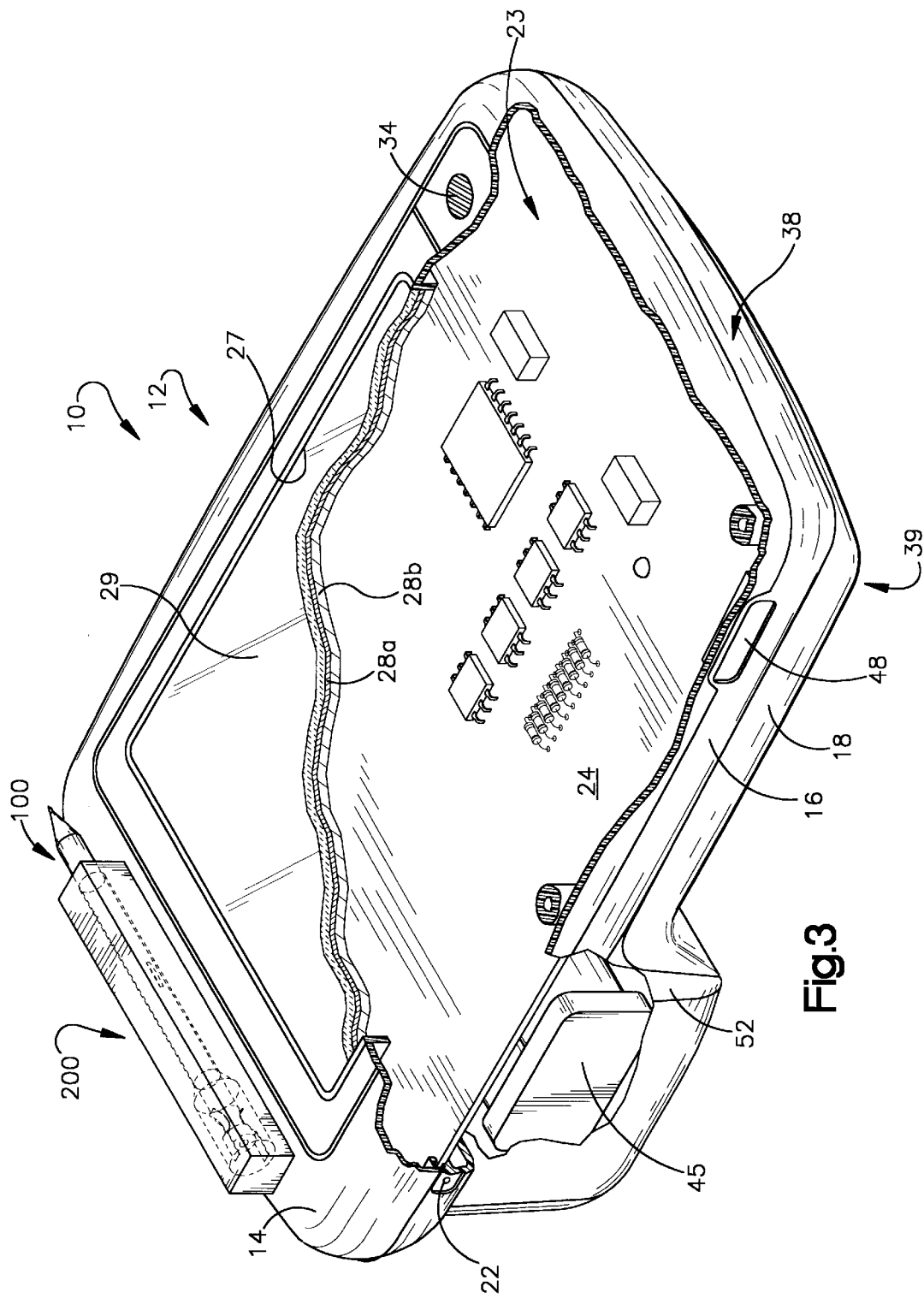
FIG. 3 is a cut away perspective view of the workslate computer showing a printed circuit board of the workslate computer.

A top face 26 of the upper section 14 is generally rectangular and planar and includes an opening 27 through which an interactive visual display screen assembly 28 is visible. The display screen assembly 28 is approximately 4×3.5 inches and includes a liquid crystal display (LCD) screen 28a, a sensing board or panel 28b and an overlying tempered glass panel 29 (seen in FIG. 3) for protecting the other components of the display screen assembly 28. As can be seen in FIG. 3, the LCD screen 28a overlies the sensing panel 28b.

Also accessible through openings in the top face 26 of the housing upper half 14 are a plurality of switches including an on/off switch 30, a visual display screen brightness control switch 31, a visual display screen contrast control switch 32. A speaker 33 (shown schematically in FIG. 7) is mounted beneath a grated opening 34. A switch 35 which functions as a right "mouse" key is also disposed on the top face 26. A light emitting diode 35a functions as a workslate computer "on" indicator (one color illuminated) and low battery indicator (second color illuminated).

The switches 30, 31, 32 are mounted at a 45 degree angle with respect to a horizontal axis H—H and a vertical axis V—V of the workslate computer 10 so as to facilitate its use in either a landscape mode or a portrait mode. When used in the landscape mode, the workslate computer 10 is supported along a forearm of the user and the operator views the visual display screen assembly 28 from left to right along the horizontal axis H—H (FIG. 1). In the portrait mode, the workslate computer 10 is held in a user's hand and the user views the visual display screen assembly 28 from left to right along the vertical axis V—V. When the workslate computer 10 is used in the landscape mode, along a side of the visual display screen assembly 28, a plurality of user definable function keys 36 are positioned.

The workslate computer housing 12 includes the top face 26 and a bottom face 39 separated by a side wall 38 (FIG. 3) which defines an interior region. A cradle contact connector 37 (FIG. 2) extends through the side wall 38 of the workslate computer housing 12, providing a plurality of contacts for a serial data port 40 (four contacts) (shown schematically in FIG. 7), a battery charger connection 44 (two contacts—positive five volts DC and ground) for charging a battery pack 45 of the workslate computer 10 and a hardwired communications link 46 (four contacts). The communications link 46 conforms to the Ethernet standard for output or downloading of data collected during a work session which is stored in an internal memory 47 of the workslate computer. The memory 47 is supported on a separate PC board coupled to the PC board 23. Accessible through a second opening in the side wall 38 is a IRD (Infared Data Association) window 48 (FIG. 1) providing a link 50 (shown schematically in FIG. 7) for infrared data communication with an external device such as a printer (not shown).

Figure 7:
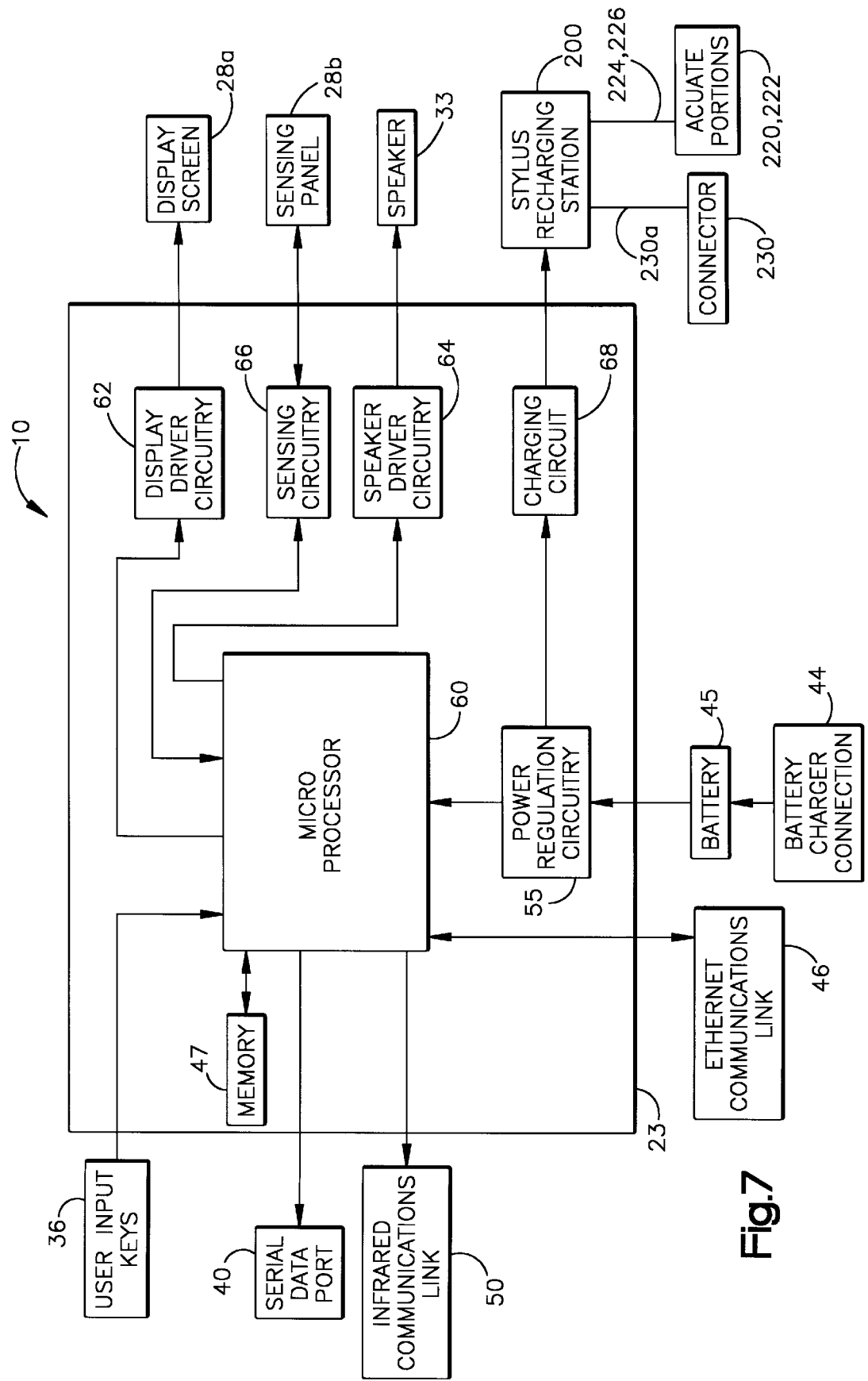
FIG. 7 is a schematic block diagram of selected circuitry of the workslate computer.

The lower section 16 of the housing 12 includes a downwardly extending portion 52 (FIGS. 2 and 3) of the bottom face 39 which defines a portion of the housing interior area in which the rechargeable battery pack 45 (FIG. 5) is disposed. The battery pack 45 includes a plurality of rechargeable battery cells which provides power to power regulation circuitry 55 (FIG. 7). The power regulation circuitry 55, in turn, provides a regulated source of DC power to both workslate computer electronics and electronics of any peripheral module attached or docked to the workslate computer housing 12. The battery pack 45 is recharged via the battery charger connection 44. A hinged door 56 having a rotatable lock 56a is provided in the downwardly extending portion 52 of the housing lower section 16 to allow access to the battery pack 45 so that it can be removed from the housing 12 if and when it becomes necessary to replace the battery pack.

The housing bottom face 39 also includes the docking station cover 18. When the cover 18 is removed, a docking station or peripheral module receiving station is accessible so that a selected one of a plurality of peripheral modules may be attached to the workslate computer 10 to perform a plurality of functions not available with the base workslate computer.

As can be seen schematically in FIG. 7, electronic circuitry mounted on the printed circuit board 23 includes the memory 47 and the power regulation circuitry 55. Overall control of the workslate computer 10 is performed by a suitable microprocessor 60 mounted on the board. The microprocessor 60 utilizes display driver circuitry 62 to cause the LCD display screen 28a to form appropriate images on the panel. Similarly, the microprocessor 60 utilizes speaker driver circuitry 64 to emit appropriate audible sounds from the speaker 33.

Figure 2:
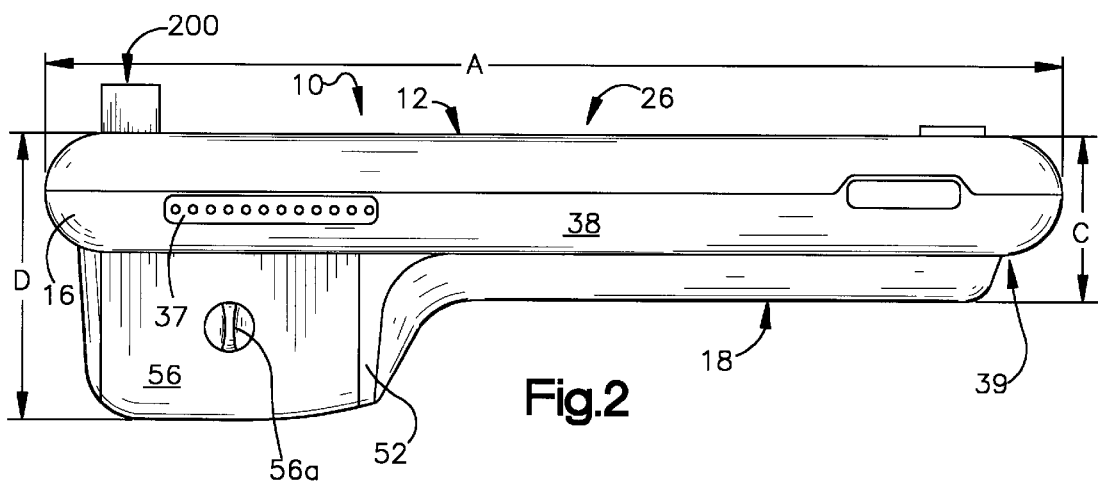
FIG. 2 is a front elevation view of the workslate computer.

As will be explained below in detail, data and commands may be advantageously input to the microprocessor 60 by the operator utilizing an untethered, electronic stylus 100 (FIGS. 1–3). When not in use, the stylus 100 is supported in a stylus charging station 200 which both keeps the stylus out of harm's way and recharges the stylus' power supply, i.e., rechargeable batteries supported within the stylus. The stylus 100 generates radio frequency signals which are sensed by the sensing panel 28b. The location of the stylus 100 with respect to the display screen assembly 28 is determined by the microprocessor 60 utilizing sensing circuitry 66 mounted on the printed circuit board 23. The power regulation circuitry 55 mounted on the printed circuit board 23 is coupled to charging circuitry 68 which outputs constant voltage and current power to the stylus recharging station 200.

The electronic stylus 100 (best seen in FIGS. 4–6) is removed from the stylus charging station 200 and manipulated by the operator of the workslate computer 10 to input data and commands to the workslate computer 10 via the display screen assembly 28. The stylus 100 is not tethered to the workslate computer 10, that is, there is no mechanical connection to the workslate computer housing 12 when the stylus is in use. The stylus 100 is only attached to the workslate computer 10 when it is secured in the charging station 200. The stylus 100, when actuated, emits radio frequency (rf) signals at one of three different frequencies. The generated rf signals of the stylus are sensed by the sensing panel 28b of the display screen assembly 28 and correlated by the sensing circuitry 66 to determine and/or track a position of the stylus distal end 106 as it is passed over the display screen assembly 28 tempered glass cover 29.

Figure 8:
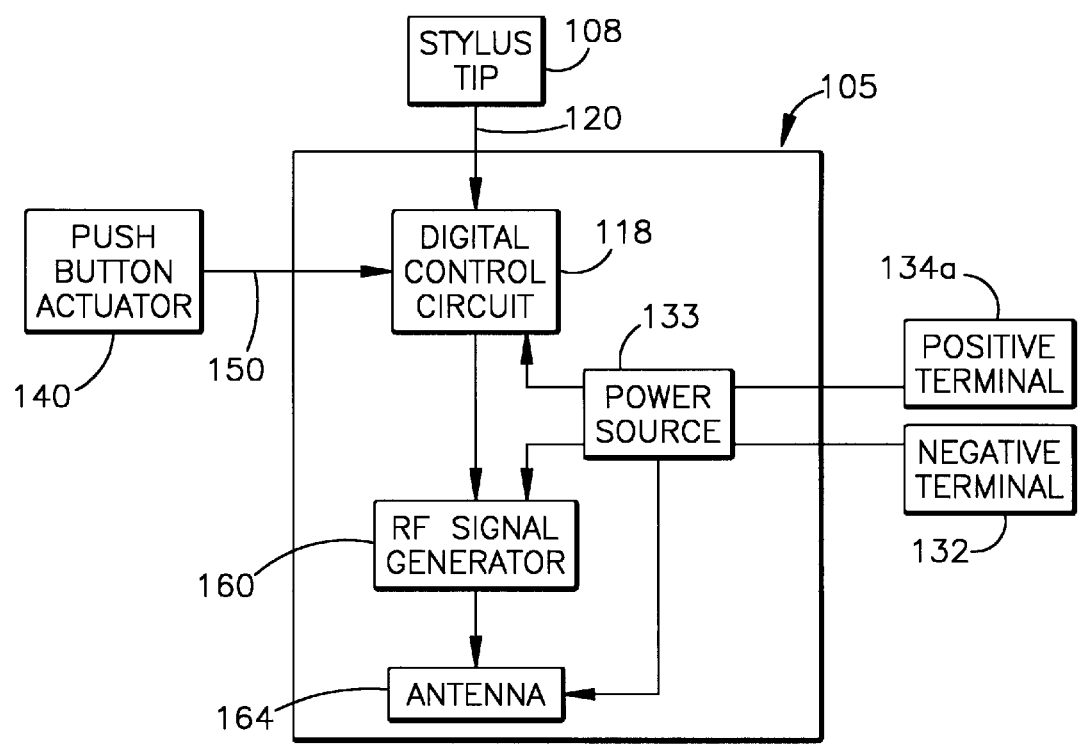
FIG. 8 is a schematic block diagram of selected circuitry of the stylus.

The stylus 100 includes an elongated, generally cylindrically shaped housing or case 102 having a longitudinal axis L—L. The stylus 100 defines an interior region 104 (FIG. 6) that supports stylus electronics 105 (schematically shown in FIG. 8). The case 102 may be fabricated of any high impact, durable, insulating material such as polyvinyl chloride (PVC). A distal or writing end 106 of the stylus 100 tapers down to an opening into which a metallic tip or insert 108 is supported. The tip 108 is biased outwardly by a coiled spring 110 (FIG. 6) but is restricted from being pushed out of the distal end opening by an outwardly extending flanged portion 112 of the pin.

When the stylus tip 108 is depressed by an operator pushing the stylus tip 108 against the display screen assembly 28 tempered glass cover 29, a proximally extending portion 114 of the tip 108 bridges electrical contacts on a support 116. The support 116 is electrically coupled to a digital control circuit 118 via leads 120. The digital control circuit 118 senses whether the tip 108 is depressed or not by monitoring whether the electrical contacts on the support 116 are bridged.

Spaced from a proximal end 130 of the stylus 110 is a conductor 132 comprised of copper or other conductive material. The conductor 132 is concave in shape and is electrically coupled to a negative terminal of the rechargeable power source 133 and, therefore, functions as a negative terminal for charging the rechargeable power source as will be discussed below. The proximal end 130 of the stylus 100 also supports a disk shaped conductor 134 comprised of copper or other conductive material. The conductor 134 is electrically coupled to a positive terminal 134a (FIG. 8) of the rechargeable power source 133 and, therefore, functions as a positive terminal for charging the rechargeable power source. Extending through a central opening in the case 102 is a push button actuator 140 of a switch assembly 142. The push button actuator 140 is biased outwardly by two coiled springs 147 (FIG. 6) but is restricted from being pushed out of the case 102 by an outwardly extending flanged portion 144 of the pin.

The push button actuator 140 is positioned so that it can be depressed by a thumb of the operator when the stylus 100 is in a writing position in the hand of the operator. When the push button actuator 140 is depressed by the operator, a radially inwardly extending portion 146 of the actuator bridges electrical contacts on a support 148. The support 148 is electrically coupled to the digital control circuit 118 via leads 150. The digital control circuit 118 senses whether the push button actuator 140 is depressed or not by monitoring whether the electrical contacts on the support 148 are bridged.

The power source 133 is rechargeable and preferably constitutes one or more Nickel-Cadmium (Ni-Cd) rechargeable battery cells comprising a battery pack. Alternatively, one or more Nickel Metal Hydride (Ni-H) battery cells may be utilized. Yet another option is one or more Lithium-Ion (Li-ion) battery cells. Preferably, the power source battery pack is permanently sealed in the case 102 and is not removable nor is any of the other electronic circuitry 105 (FIG. 8) of the stylus removable. As can be seen in FIG. 6, the power source 133 is electrically coupled to supply power to the digital control circuit 118, a radio frequency (rf) signal generator and amplifier 160 and an antenna 164. The radio frequency signal generator 160 is electrically coupled to and controlled by the digital control circuit 118.

Preferably, generator 160 when actuated produces an RF signal in the 480 kHz range. If the push button actuator 140 is depressed such that the inwardly extending portion 146 bridges the contacts of the support 148, the digital control circuit 118 transmits control signals to the generator 160 to cause the generator to transmit a signal at a first frequency, e.g., 473.0 kilohertz (kHz)±4.0 kHz so long as the actuator 140 remains depressed. If the actuator 140 is not depressed, but the stylus tip 108 is depressed such that the proximally extending portion 114 bridges the contacts of the support 116, the digital control circuit 118 causes the generator 160 to transmits a signal at a second frequency, e.g., 487.8 kHz±6.5 kHz. If however, the actuator 140 is not depressed and the stylus tip 108 is not depressed the digital control circuit 118 causes the generator 160 to generate a signal a third frequency, e.g., 461.3 kHz±4.0 kHz. Alternatively, the digital control circuit 118 could be programmed to have the signal generator 160 be inactive if neither the actuator 140 nor the tip 108 are depressed.

The output signal from the signal generator 160 is amplified and coupled to the antenna 164 where the signal is transmitted such that it is readily discernable by the display screen assembly sensing panel 28b when the distal end 106 of the stylus 100 is proximal to the glass cover 29 of the display screen assembly 28.

The stylus charging station 200 extends upwardly from the upper surface of the workslate computer upper face 26

(FIGS. 1 and 2). The charging station 200 includes an elongated generally cylindrical opening defining an interior docking station 202 into which the stylus 100 is received when not in use. As can best be seen in FIGS. 5 and 6, the proximal end 130 is inserted into the a forward end 204 of the docking station 202 until a pair of clamps 206, 208 capture the inwardly bowed conductor 132 of the stylus 100. The insertion of the stylus is aided by wall portions 209 defining a proximal portion of the docking station. The clamps 206, 208 extend from a rear wall 210 of the charging station 200 and are radially inwardly biased by respective coiled springs 212, 214.

The clamps 206, 208 have sufficient inward force to secure the stylus 100 from dropping out of the charging station 200 as the workslate computer 10 is being moved about a workplace, however, the force is low enough to allow easy removal of the stylus from the charging station by grasping the case 102 near the distal end 106 and pulling it in a distal direction along its axis L—L. Arcuate portions 220, 222 of the respective clamps are comprised of a conductive material such as copper and function as part of a charging assembly of the charging station. The arcuate portions 220, 222 provide electrical contact with the conductor 132 which, as noted previously, functions as the ground connection for charging the power source 133. The arcuate portions 220, 222 are coupled by leads 224, 226 which extend through a lower wall 228 of the charging station 200 and into the workslate computer housing interior region where they are connected to electrical ground.

A spring biased connector 230 is also part of the charging station charging assembly and extends from the rear wall 210 of the charging station 200. When the stylus 100 is fully inserted in the docking station 202 (FIG. 6), the connector 230 contacts the conductor 134 which functions as the positive lead of the power source 133 for charging purposes. The connector 230 is coupled to a positive lead 230a of the charging circuitry 68 (FIG. 7) of the printed circuit board 23 of the workslate computer via a lead 232 (FIG. 6). The spring biasing of the connector 230 insures a positive electrical connection between the conductor 134 and the charging circuitry 68 even if the workslate computer 10 is being moved about. As long as the stylus 100 is fully inserted in the charging station docking station 202, the power source 133 will be charged. The charging circuitry 68 will appropriately slow the charging rate to a trickle charge as the power source 133 approaches full charge.

The stylus sensing panel 28b is positioned underneath the display screen 28a. The sensing panel 28b is part of a sensing assembly including the sensing circuitry 66 and the microprocessor 60. The sensing panel 28b comprises a rectangular array or matrix of conductive traces on a printed circuit (PC) board. The traces form a crossword puzzle pattern of intersecting traces and extend in directions parallel to the horizontal axis H—H and the vertical axis V—V. When the distal end 106 of the stylus 100 comes in close proximity to the sensor panel 28b, the rf signal transmitted by the stylus induces electrical current in the PC board traces. The currents are sensed by the sensing circuitry 66 and processed by the microprocessor 60.

The microprocessor 60 analyzes the inputs from the sensing circuitry 66 and determines the location on the sensing panel 28b corresponding to the stylus distal end 106. A suitable sensing panel and corresponding sensing circuitry is available from Kurta Corporation of Phoenix, Ariz. The sensing panel and sensing circuitry manufactured by Kurta Corporation is utilized in the Model No. 1180 pen based workslate computer sold by Telxon Corporation of Akron, Ohio.

By appropriately moving the distal or signal generating end 106 with respect to the display screen assembly 28, the operator can enter data and commands by "picking" or selecting icons or other images displayed on the display screen 28a by the microprocessor 60 using the display driver circuitry 62. The sensing assembly, i.e., the sensing panel 28b, the sensing circuitry 66 and the microprocessor 60 will sense and determine the position of the stylus distal end 106 and correlate its position with respect to "picking" images displayed on the LCD screen 28a.

For example, the operator can input numerical data by appropriately sequentially touching the stylus tip 108 on glass panel 29 at locations corresponding to numbers desired on the numerical keypad image 70 (FIG. 1). The sensing assembly will sense the position of the stylus tip 108 with respect to the display screen assembly 28, the microprocessor 60 will determine what numerical image or images have been selected and the display driver circuitry 62 will be used to display the selected numbers in a display portion 72 of the display screen 28a. Here, the number "392.1" has been selected by the operator by sequentially "picking" images corresponding to "3", "9", "2", "." and "1". If the displayed input number is correct, the operator will enter the data into the computer 10 by touching the stylus tip 108 in the image area 74 marked "ENTER". If the input number is not correct, the operator will delete the number in the display portion 72 by touching the at the stylus tip 108 in the image area 76 marked "CANCEL".

Figure 9:
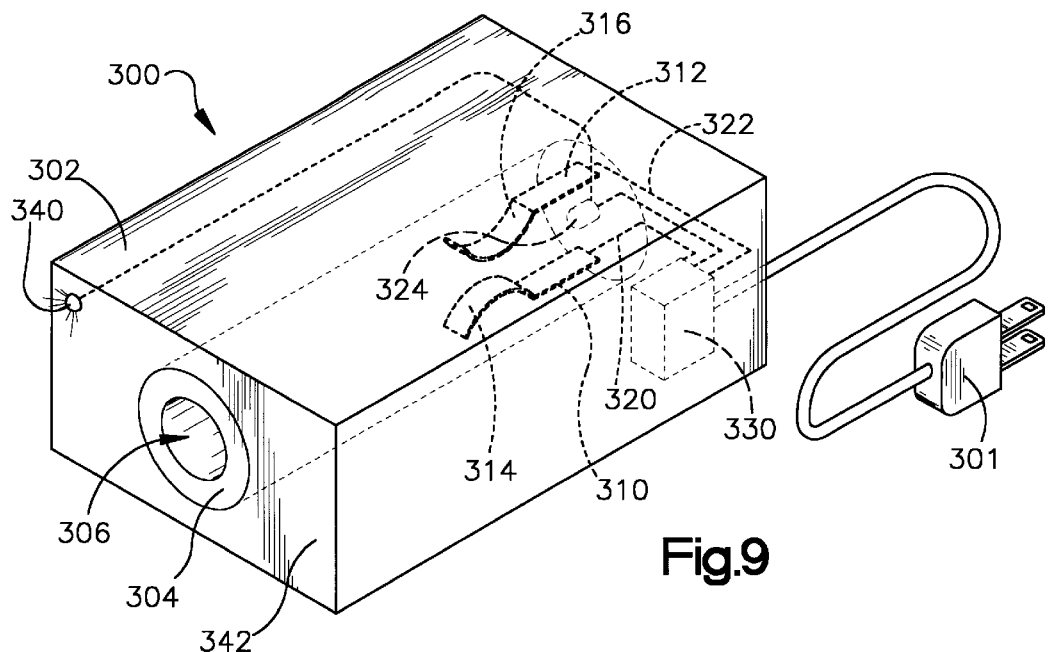
FIG. 9 is a second embodiment of a recharging station for the stylus.

A second embodiment of a stylus charging station for the stylus 100 is shown generally at 300 in FIG. 9. The recharging station 300 is a stand alone unit which is plugged via a plug 301 into a standard AC 120 volt wall outlet. The charging station 300 includes generally rectangular housing 302 for stability. The housing 302 supports a tubular portion 304 having an elongated generally cylindrical opening defining a docking station 306 into which the proximal end 130 of the stylus 100 is inserted, as described in the first embodiment. The stylus 100 is mechanically captured by a pair of spring biased clamps 310, 312. The charging station 300 includes a charging assembly including respective conductive arcuate portions 314, 316 of the spring biased clamps which electrically contact the stylus conductor 132 which, as noted previously, functions as the ground connection for charging the stylus power source 133. The arcuate portions 314, 316 are coupled by leads 320, 322 to electrical ground.

A spring biased connector 324 is also part of the charging station charging assembly and extends from a rear wall of the tubular portion 304. When the stylus 100 is fully inserted in the docking station 306, the connector 324 contacts the conductor 134 which functions as the positive lead of the power source 133 for charging purposes. The connector 324 and the grounding leads 320, 322 are coupled to charging circuitry 330 which rectifies the AC power from the wall outlet and provides regulated DC power to the connector 324. As long as the stylus 100 is fully inserted in the charging station docking station 304, the stylus power source 133 will be charged. The charging circuitry 330 will appropriately slow the charging rate of the stylus power source 133 to a trickle charge as the power source 133 approaches full charge. When the stylus power source 133 is charged to approximately 90% of fully charge capability, the charging circuitry 330 actuates a light emitting diode 340 extending through an opening in a front wall 342 of the housing 302.

Figure 10:
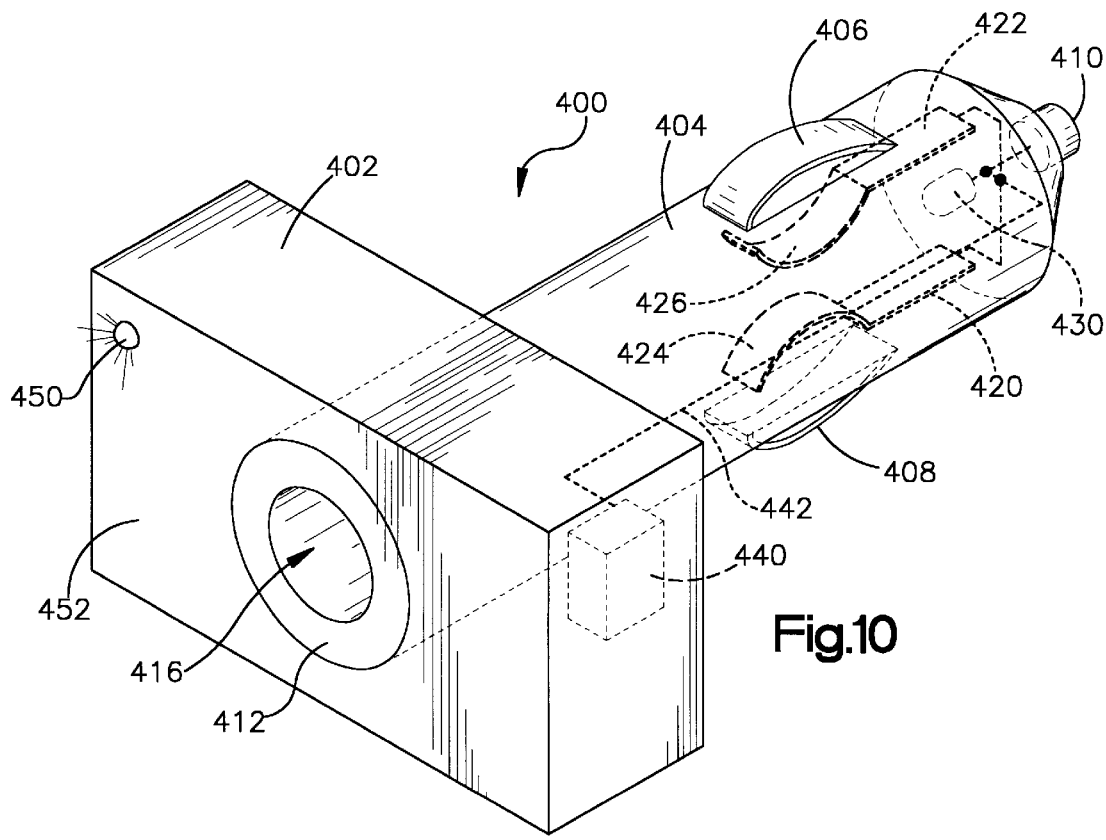
FIG. 10 is a third embodiment of a recharging station for the stylus.

A third embodiment of a charging station for the stylus 100 is shown generally at 400 in FIG. 10. The recharging station 400 includes a rectangular housing 402 having a plug 404 extending from a rear of the housing. The plug 404 is adapted to be inserted into a cigarette lighter receptacle of a vehicle to receive power for recharging the stylus 100 from a standard 12 volt DC battery utilized by the vehicle. The plug 404 includes two external bumps 406, 408 to securely engage the cigarette lighter receptacle and a conductive contact 410 which electrically contacts a mating positive terminal contact at a rear of the cigarette lighter receptacle.

The charging station housing 402 and plug 404 include a tubular portion 412 having an elongated generally cylindrical opening defining a docking station 416 into which the proximal end 130 of the stylus 100 is inserted, as described in the first embodiment. The stylus 100 is mechanically captured by a pair of spring biased clamps 420, 422. The charging station 400 includes a charging assembly including respective conductive arcuate portions 424, 426 of the spring biased clamps 420, 422 which electrically contact the stylus conductor 132 which, as noted previously, functions as the ground connection for charging the stylus power source 133. The arcuate portions 424, 426 are coupled by leads to electrical ground.

A spring biased connector 430 is also part of the charging station charging assembly and extends from a rear wall of the plug 404. When the stylus 100 is fully inserted in the docking station 416, the connector 430 contacts the stylus conductor 134 which functions as the positive lead of the power source 133 for charging purposes. The connector 430 and the arcuate portions 424, 426 are appropriately connected by separate leads to charging circuitry 440. For ease of illustration, the separate leads are not drawn separately but are shown as being coupled to a common multi-lead conductor 442. The charging circuitry 440 receives power from the vehicle battery via a lead connected to the conductive contact 410. The charging circuitry 440 provides regulated DC power to the connector 430. As long as the stylus 100 is fully inserted in the charging station docking station 416, the power source 133 will be charged. The charging circuit 440 will appropriately slow the charging rate to a trickle charge as the power source 133 approaches full charge. When the stylus power source 133 is charged to approximately 90% of fully charge capability, the charging circuit 440 will actuate a light emitting diode 450 extending through an opening in a front wall 452 of the housing 402.

While the present invention has been described with a degree of particularity, it is the intent that the invention include all modifications and alterations from the disclosed design falling within the spirit and scope of the appended claims.

I claim:

1. A pen based computer comprising:
   a) a housing supporting computer electronics and including a stylus support;
   b) a visible interactive display screen assembly supported by the housing, the display screen assembly including a sensing assembly; and
   c) an untethered, rechargeable stylus for inputting data to the computer electronics via positioning the stylus with respect to images displayed on the display screen assembly, the stylus including:
      i) a stylus case adapted to be removably secured to the workslate computer housing stylus support, the stylus case supporting stylus electronics and a rechargeable power source;
      ii) the stylus electronics including a signal generator for generating a signal received by the sensing assembly and correlated to a position of the stylus with respect to the display screen assembly by the sensing assembly;
      iii) the rechargeable power source coupled to the stylus electronics; and
      iv) a first conductor and a spaced apart second conductor, the first and second conductors electrically coupled to a negative terminal and a positive terminal respectively of the rechargeable power source to provide a conductive path for recharging the power source, the conductors being accessible from an exterior of the stylus case; and
      v) wherein the stylus case is generally cylindrically shaped and includes a first end and a spaced apart second end and the first conductor comprises a concave shaped conductive member forming a part of the case adjacent the case second end.

2. The pen based computer of claim 1 wherein the computer is portable and a surface area of the display screen assembly occupies at least 50 percent of a total surface area of an upper surface of the housing.

3. The pen based computer of claim 1 wherein the housing stylus support includes a clamp that releasably secures the stylus to the computer housing, the clamp having a concave shaped arcuate portion engaging the concave shaped conductive member of the stylus first conductor to releasably secure the stylus case to the housing stylus support.

4. The pen based computer of claim 3 wherein housing stylus support defines an elongated opening adapted to receive the second end of the stylus and the clamp is disposed within the opening.

5. The pen based computer of claim 4 wherein the housing stylus support includes charging circuitry having an electrical ground lead and a positive voltage lead for recharging the stylus rechargeable power source when the stylus case is releasably secured to the computer housing stylus support.

6. The pen based computer of claim 5 wherein the arcuate portion of the clamp is conductive and electrically coupled to an electrical ground of the charging circuitry and further wherein the first conductor electrically contacts the arcuate portion of the clamp to electrically couple the rechargeable power source negative terminal to the charging station ground lead when the stylus case is releasably secured to the housing stylus support.

7. The pen based computer of claim 5 wherein the second conductor is a disk shaped member supported by the second end of the stylus and further wherein the housing stylus support includes a positive connector at a proximal end of the opening, the positive connector coupled to the positive lead of the charging circuitry and electrically contacting the second conductor to electrically couple the positive voltage lead of the charging circuitry to the positive terminal of the stylus rechargeable power source to charge the stylus power source when the stylus case is releasably secured to the computer housing.

8. The pen based computer of claim 1 wherein the stylus electronics includes a digital control circuit electrically coupled to the signal generator and generating control signals to cause the signal generator to generate signals at a selected one of a plurality of signal frequencies.

9. The pen based computer of claim 8 wherein a push button actuator of a switch assembly extends through a central opening in the stylus case, the actuator being electrically coupled to the digital control circuit and movable between a first and a second position, the digital control circuit causing the signal generator to generate a signal having a first frequency when the actuator is in the first position and to generate a signal having a second frequency when the actuator is in the second position.

10. The pen based computer of claim 8 wherein a depressible tip extends through the first end of the stylus case, the tip being electrically coupled to the digital control circuit and movable between a first and a second position, the digital control circuit causing the signal generator to generate a signal having a first frequency when the tip is in the first position and to generate a signal having a second frequency when the tip is in the second position.

11. A rechargeable electronic stylus for inputting data and commands through a sensing assembly of a display screen assembly of a pen based computer and being free of any mechanical connection to the computer when in use, the stylus comprising:

a) a case adapted to be removably secured to a charging station, the stylus case supporting stylus electronics and a rechargeable power source;

b) the stylus electronics including a signal generator for generating a signal received by the computer sensing assembly and correlated by the sensing assembly to a position of the stylus with respect to the display screen assembly;

c) the rechargeable power source coupled to the stylus electronics;

d) a first conductor and a spaced apart second conductor, the first and second conductors electrically coupled to a negative terminal and a positive terminal respectively of the rechargeable power source to provide a conductive path for recharging the power source, the first and second conductors being accessible from an exterior of the stylus case and being coupled to an electrical around lead and a positive voltage lead of charging circuitry of the charging station to charge the rechargeable power source when the stylus case is secured to the charging station; and e) wherein the stylus case is generally cylindrically shaped and includes a first end and a spaced apart second end, the first conductor comprising a concave shaped conductive member forming a part of the case adjacent the casing second end and the second conductor comprising a disk shaped conductive member at the second end.

12. The rechargeable electronic stylus of claim 11 wherein the concave shaped conductive member of the stylus is engaged by a concave shaped arcuate portion of a clamp of the charging station to releasably secured the stylus case to the charging station.

13. The rechargeable electronic stylus of claim 12 wherein the second end of the stylus is configured to be received in an elongated opening of the charging station within which the charging station clamp is disposed.

14. The rechargeable electronic stylus of claim 13 wherein the first conductor electrically contacts the arcuate portion of the clamp to electrically couple a negative terminal of the rechargeable power source to the electrical ground lead of the charging station charging circuitry when the stylus case is releasably secured to the charging station.

15. The rechargeable electronic stylus of claim 14 wherein the second conductor electrically contacts a positive connector at a proximal end of the opening, to electrically couple the positive voltage lead of the charging station charging circuitry to the positive terminal of the stylus rechargeable power source to charge the stylus power source when the stylus case is releasably secured to the charging station.

16. The rechargeable electronic stylus of claim 11 wherein the stylus electronics includes a digital control circuit electrically coupled to the signal generator and generating control signals to cause the signal generator to one of a plurality of signals each having a different frequency.

17. The rechargeable electronic stylus of claim 16 wherein a push button actuator of a switch assembly extends through an central opening in the stylus case, the actuator being electrically coupled to the digital control circuit and movable between a first and a second position, the digital control circuit causing the signal generator to generate a signal having a first frequency when the actuator is in the first position and to generate a signal having a second frequency when the actuator is in the second position.

18. The rechargeable electronic stylus of claim 16 wherein a depressible tip extends through the first end of the stylus case, the tip being electrically coupled to the digital control circuit and movable between a first and a second position, the digital control circuit causing the signal generator to generate a signal having a first frequency when the tip is in the first position and to generate a signal having a second frequency when the tip is in the second position.

19. The rechargeable electronic stylus of claim 11 wherein the charging station is integral with the pen based computer.

* * * * *